United States Patent
Mezza et al.

(10) Patent No.: US 9,309,471 B2
(45) Date of Patent: Apr. 12, 2016

(54) DECONTAMINATION OF DEOXYGENATED BIOMASS-DERIVED PYROLYSIS OIL USING IONIC LIQUIDS

(71) Applicant: UOP LLC, Des Plaines, IL (US)

(72) Inventors: Beckay J. Mezza, Arlington Heights, IL (US); Haiyan Wang, Hoffman Estates, IL (US); Alakananda Bhattacharyya, Glen Ellyn, IL (US); Christopher P. Nicholas, Evanston, IL (US)

(73) Assignee: UOP LLC, Des Plaines, IL (US)

( * ) Notice: Subject to any disclaimer, the term of this patent is extended or adjusted under 35 U.S.C. 154(b) by 811 days.

(21) Appl. No.: 13/633,637

(22) Filed: Oct. 2, 2012

(65) Prior Publication Data

US 2014/0005451 A1    Jan. 2, 2014

Related U.S. Application Data

(60) Provisional application No. 61/665,965, filed on Jun. 29, 2012.

(51) Int. Cl.
| | |
|---|---|
| *C10G 21/27* | (2006.01) |
| *C10G 21/06* | (2006.01) |
| *C10G 3/00* | (2006.01) |

(52) U.S. Cl.
CPC .......... *C10G 21/27* (2013.01); *C10G 3/50* (2013.01); *C10G 21/06* (2013.01); *C10G 2300/1011* (2013.01); *C10G 2300/202* (2013.01); *Y02P 30/20* (2015.11)

(58) Field of Classification Search
None
See application file for complete search history.

(56) References Cited

U.S. PATENT DOCUMENTS

| 8,574,427 | B2 * | 11/2013 | Mezza et al. | 208/87 |
| 2011/0245554 | A1 * | 10/2011 | Huber et al. | 585/251 |
| 2012/0323057 | A1 * | 12/2012 | Heinerman et al. | 585/240 |
| 2012/0330074 | A1 * | 12/2012 | Heinerman et al. | 585/242 |

\* cited by examiner

*Primary Examiner* — Tam M Nguyen

(57) ABSTRACT

Embodiments of methods for purifying a biomass-derived pyrolysis oil are provided. The method comprises the step of contacting the biomass-derived pyrolysis oil with a first deoxygenating catalyst in the presence of hydrogen at first predetermined hydroprocessing conditions to form a first low-oxygen biomass-derived pyrolysis oil effluent. The low-oxygen biomass-derived pyrolysis oil effluent is contacted with an ionic liquid to remove phenolic compounds, nitrogen compounds and other impurities. This ionic liquid step may be followed by a second deoxygenation step or the deoxygenating may be completed and then followed by the ionic liquid purification step.

16 Claims, No Drawings

DECONTAMINATION OF DEOXYGENATED BIOMASS-DERIVED PYROLYSIS OIL USING IONIC LIQUIDS

CROSS-REFERENCE TO RELATED APPLICATION

This application claims priority from Provisional Application No. 61/665,965 filed Jun. 29, 2012, the contents of which are hereby incorporated by reference.

FIELD OF THE INVENTION

The present invention relates generally to methods and catalysts for producing biofuels, and more particularly to methods for producing purified low-oxygen content biomass-derived pyrolysis oil by the treatment of deoxygenated biomass-derived pyrolysis oil with ionic liquids to remove contaminants.

BACKGROUND OF THE INVENTION

Fast pyrolysis is a process during which organic carbonaceous biomass feedstock, i.e., "biomass", such as wood waste, agricultural waste, algae, etc., is rapidly heated to between about 300° and about 900° C. in the substantial absence of oxygen using a pyrolysis reactor. Fast pyrolysis processes include Rapid Thermal Processing (RTP), in which an inert or catalytic solid particulate is used to carry and transfer heat to the feedstock. Under these conditions, solid products, liquid products, and gaseous pyrolysis products are produced. A condensable portion (vapors) of the gaseous pyrolysis products is condensed into biomass-derived pyrolysis oil. Biomass-derived pyrolysis oil can be burned directly as fuel for certain boiler and furnace applications, and can also serve as a potential feedstock in catalytic processes for the production of fuels in petroleum refineries. Biomass-derived pyrolysis oil has the potential to substitute for traditional petroleum-derived transportation fuels, thereby reducing the dependency on conventional sources and reducing the environmental impact.

However, biomass-derived pyrolysis oil is a complex, highly oxygenated organic liquid having properties that currently limit its utilization as a biofuel. For example, biomass-derived pyrolysis oil has high acidity and a low energy density attributable in large part to oxygenated hydrocarbons in the oil, which undergo secondary reactions during storage. "Oxygenated hydrocarbons" as used herein are organic compounds containing hydrogen, carbon, and oxygen. Exemplary oxygenated hydrocarbons produced from pyrolysis include carboxylic acids such as acetic acid, phenols, cresols, and aldehydes such as furfural, levoglucosan, etc. It should be appreciated that while the oil produced according to exemplary embodiments of the present invention is generally described herein as a "low oxygen biomass-derived pyrolysis oil", this term generally includes any oil produced having a lower oxygen concentration than conventional biomass-derived pyrolysis oil. Conventional biomass-derived pyrolysis oil comprises about 30% by weight oxygen from these oxygenated hydrocarbons. Significant upgrading, however, may be achieved by hydroprocessing of the raw pyrolysis oil. Conversion of biomass-derived pyrolysis oil into biofuels and chemicals requires full or partial deoxygenation of the biomass-derived pyrolysis oil.

Accordingly, it is desirable to provide methods and catalysts for producing purified low-oxygen biomass-derived pyrolysis oils. Such deoxygenation may proceed via two main routes, namely the elimination of either water or $CO_2$ from hydrogenation or decarboxylation, respectively. In the present invention, the pyrolysis oils are hydrotreated to remove the majority of the oxygen. Then the treated pyrolysis oil is treated with ionic liquids to remove the oxygenated hydrocarbons that are resistant to hydrotreating including phenols and similar compounds.

The biomass-derived pyrolysis oils are contaminated with phenols, nitrogen-containing compounds, metals and other undesirable contaminants that interfere with processing to produce higher grade fuels. For example, such contaminants are harmful to hydrocracking catalysts so that it is highly desirable to remove them before hydrocracking. One possible method to remove the nitrogen compounds is by hydrotreating, but it is costly and takes considerable energy. Despite recent progress in the area of biofuel development, however, there remains a need in the art for improved methods of removing contaminants from pyrolysis oil, particularly for phenols. It has now been found that ionic liquids can be used to purify the low-oxygen content biomass-derived pyrolysis oils to remove phenolic compounds and/or nitrogen containing compounds.

Furthermore, other desirable features and characteristics of the present invention will become apparent from the subsequent detailed description of the invention and the appended claims.

SUMMARY OF THE INVENTION

Methods for deoxygenating and removing nitrogen compounds from a biomass-derived pyrolysis oil are provided herein. In accordance with an embodiment, a method for deoxygenating a biomass-derived pyrolysis oil comprises the step of contacting the biomass-derived pyrolysis oil with a first deoxygenating catalyst in the presence of hydrogen at first predetermined hydroprocessing conditions to form a first low-oxygen biomass-derived pyrolysis oil effluent. Then the first low-oxygen biomass-derived pyrolysis oil effluent is treated with an ionic liquid to remove a substantial amount of nitrogen compounds. A particular advantage of the present invention is the removal of phenolic compounds. The resulting low nitrogen biomass-derived pyrolysis oil effluent may then be treated in a second stage deoxygenating step in which the level of oxygen compounds is further reduced.

In accordance with another embodiment of the invention, a method for deoxygenating a biomass-derived pyrolysis oil is provided. The method comprises the step of introducing hydrogen and a feed stream comprising the biomass-derived pyrolysis oil to a first hydroprocessing reactor containing a first deoxygenating catalyst. The first hydroprocessing reactor is operating at first predetermined hydroprocessing conditions using a deoxygenating catalyst to form a first low-oxygen biomass-derived pyrolysis oil effluent. Then the first low-oxygen biomass-derived pyrolysis oil effluent may be sent to a second hydroprocessing reactor containing a second deoxygenating catalyst to produce a lower oxygen biomass-derived pyrolysis oil effluent. Then the lower oxygen biomass-derived pyrolysis oil effluent is treated with an ionic liquid to remove a substantial amount of nitrogen compounds. Other impurities such as metals and phenolic compounds may also removed by the ionic liquid.

The ionic liquids that are used may be selected from the group consisting of at least one of a imidazolium ionic liquid, a phosphonium ionic liquid, and a pyridinium ionic liquid. Preferably the ionic liquid the pyrolysis oil-immiscible phosphonium ionic liquid comprises at least one ionic liquid from at least one of the following groups of ionic liquids: 1-ethyl- 3-methylimidazolium ethyl sulfate, 1-butyl-3-methylimidazolium hydrogen sulfate, 1-ethyl-3-methylimidazolium chloride, 1-butyl-3-methylimidazolium chloride, tetrabutylphosphonium methane sulfonate, pyridinium p-toluene sulfonate, tetrabutylphosphonium chloride, tetrabutylphosphonium bromide, tributyl(octyl)phosphonium chloride, and tributyl(ethyl)phosphonium diethylphosphate, tetraalkylphosphonium dialkylphosphates, tetraalkylphosphonium dialkyl phosphinates, tetraalkylphosphonium phosphates, tetraalkylphosphonium tosylates, tetraalkylphosphonium sulfates, tetraalkylphosphonium sulfonates, tetraalkylphosphonium carbonates, tetraalkylphosphonium metalates, oxometalates, tetraalkylphosphonium mixed metalates, tetraalkylphosphonium polyoxometalates, and tetraalkylphosphonium halides. In another embodiment, the phosphonium ionic liquid comprises at least one of trihexyl(tetradecyl)phosphonium chloride, trihexyl(tetradecyl)phosphonium bromide, tributyl(methyl)phosphonium bromide, tributyl(methyl)phosphonium chloride, tributyl(hexyl)phosphonium bromide, tributyl(hexyl)phosphonium chloride, tributyl(octyl)phosphonium bromide, tributyl(octyl)phosphonium chloride, tributyl(decyl)phosphonium bromide, tributyl(decyl)phosphonium chloride, tetrabutylphosphonium bromide, tetrabutylphosphonium chloride, triisobutyl(methyl)phosphonium tosylate, tributyl(methyl)phosphonium methylsulfate, tributyl(ethyl)phosphonium diethylphosphate, and tetrabutylphosphonium methanesulfonate. In a further embodiment, the phosphonium ionic liquid is selected from the group consisting of trihexyl(tetradecyl)phosphonium chloride, trihexyl(tetradecyl)phosphonium bromide, tributyl(methyl)phosphonium bromide, tributyl(methyl)phosphonium chloride, tributyl(hexyl) phosphonium bromide, tributyl(hexyl)phosphonium chloride, tributyl(octyl)phosphonium bromide, tributyl(octyl)phosphonium chloride, tributyl(decyl)phosphonium bromide, tributyl(decyl)phosphonium chloride, tetrabutylphosphonium bromide, tetrabutylphosphonium chloride, triisobutyl(methyl)phosphonium tosylate, tributyl(methyl) phosphonium methylsulfate, tributyl(ethyl)phosphonium diethylphosphate, tetrabutylphosphonium methanesulfonate, and combinations thereof. The phosphonium ionic liquid may be selected from the group consisting of trihexyl(tetradecyl) phosphonium halides, tetraalkylphosphonium dialkylphosphates, tetraalkylphosphonium tosylates, tetraalkylphosphonium sulfonates, tetraalkylphosphonium halides, and combinations thereof. The phosphonium ionic liquid may comprise at least one ionic liquid from at least one of the following groups of ionic liquids trihexyl(tetradecyl)phosphonium halides, tetraalkylphosphonium dialkylphosphates, tetraalkylphosphonium tosylates, tetraalkylphosphonium sulfonates, and tetraalkylphosphonium halides.

DETAILED DESCRIPTION

The following Detailed Description is merely exemplary in nature and is not intended to limit the invention or the application and uses of the invention. Furthermore, there is no intention to be bound by any theory presented in the preceding Background of the Invention or the following Detailed Description.

Various embodiments contemplated herein relate to methods and catalysts for deoxygenating a biomass-derived pyrolysis oil. The embodiments taught herein produce a low-oxygen biomass-derived pyrolysis oil by contacting a biomass-derived pyrolysis oil with a deoxygenating catalyst in the presence of hydrogen at predetermined hydroprocessing conditions followed by contacting the resulting low oxygen biomass-derived pyrolysis oil with an ionic liquid to remove nitrogen compounds and other impurities.

The ionic liquids that are used may be selected from the group consisting of at least one of a imidazolium ionic liquid, a phosphonium ionic liquid, and a pyridinium ionic liquid. Preferably the ionic liquid the pyrolysis oil-immiscible phosphonium ionic liquid comprises at least one ionic liquid from at least one of the following groups of ionic liquids: 1-ethyl-3-methylimidazolium ethyl sulfate, 1-butyl-3-methylimidazolium hydrogen sulfate, 1-ethyl-3-methylimidazolium chloride, 1-butyl-3-methylimidazolium chloride, tetrabutylphosphonium methane sulfonate, pyridinium p-toluene sulfonate, tetrabutylphosphonium chloride, tetrabutylphosphonium bromide, tributyl(octyl)phosphonium chloride, and tributyl(ethyl)phosphonium diethylphosphate, tetraalkylphosphonium dialkylphosphates, tetraalkylphosphonium dialkyl phosphinates, tetraalkylphosphonium phosphates, tetraalkylphosphonium tosylates, tetraalkylphosphonium sulfates, tetraalkylphosphonium sulfonates, tetraalkylphosphonium carbonates, tetraalkylphosphonium metalates, oxometalates, tetraalkylphosphonium mixed metalates, tetraalkylphosphonium polyoxometalates, and tetraalkylphosphonium halides. In another embodiment, the phosphonium ionic liquid comprises at least one of trihexyl(tetradecyl)phosphonium chloride, trihexyl(tetradecyl)phosphonium bromide, tributyl(methyl)phosphonium bromide, tributyl(methyl)phosphonium chloride, tributyl(hexyl)phosphonium bromide, tributyl(hexyl)phosphonium chloride, tributyl(octyl)phosphonium bromide, tributyl(octyl)phosphonium chloride, tributyl(decyl)phosphonium bromide, tributyl(decyl)phosphonium chloride, tetrabutylphosphonium bromide, tetrabutylphosphonium chloride, triisobutyl(methyl)phosphonium tosylate, tributyl(methyl)phosphonium methylsulfate, tributyl(ethyl)phosphonium diethylphosphate, and tetrabutylphosphonium methanesulfonate. In a further embodiment, the phosphonium ionic liquid is selected from the group consisting of trihexyl(tetradecyl)phosphonium chloride, trihexyl(tetradecyl)phosphonium bromide, tributyl(methyl)phosphonium bromide, tributyl(methyl)phosphonium chloride, tributyl(hexyl) phosphonium bromide, tributyl(hexyl)phosphonium chloride, tributyl(octyl)phosphonium bromide, tributyl(octyl)phosphonium chloride, tributyl(decyl)phosphonium bromide, tributyl(decyl)phosphonium chloride, tetrabutylphosphonium bromide, tetrabutylphosphonium chloride, triisobutyl(methyl)phosphonium tosylate, tributyl(methyl) phosphonium methylsulfate, tributyl(ethyl)phosphonium diethylphosphate, tetrabutylphosphonium methanesulfonate, and combinations thereof. The phosphonium ionic liquid may be selected from the group consisting of trihexyl(tetradecyl) phosphonium halides, tetraalkylphosphonium dialkylphosphates, tetraalkylphosphonium tosylates, tetraalkylphosphonium sulfonates, tetraalkylphosphonium halides, and combinations thereof. The phosphonium ionic liquid may comprise at least one ionic liquid from at least one of the following groups of ionic liquids trihexyl(tetradecyl)phosphonium halides, tetraalkylphosphonium dialkylphosphates, tetraalkylphosphonium tosylates, tetraalkylphosphonium sulfonates, and tetraalkylphosphonium halides.

In an embodiment, in addition to removal of nitrogen compounds, the ionic liquid will also remove metals or phenolic compounds.

It should be appreciated that while the deoxygenated oil produced according to exemplary embodiments of the present invention is generally described herein as a "low-oxygen biomass-derived pyrolysis oil," this term generally includes any oil produced having a lower oxygen concentration than conventional biomass-derived pyrolysis oil. The term "low-oxygen biomass-derived pyrolysis oil" includes oil having no oxygen, i.e., a biomass-derived pyrolysis oil in which all the oxygenated hydrocarbons have been converted into hydrocarbons (i.e., a "hydrocarbon product"). Typically, the low-oxygen biomass-derived pyrolysis soil contains less than 10 wt % oxygen. In an embodiment, the low-oxygen biomass-derived pyrolysis oil comprises oxygen in an amount of from about 0 to about 5 wt %. Preferably, the low-oxygen biomass-derived pyrolysis oil comprises oxygen in an amount of from about 0 to about 2 wt %. "Hydrocarbons" as used herein are organic compounds that contain principally only hydrogen and carbon, i.e., oxygen-free. "Oxygenated hydrocarbons" as used herein are organic compounds containing hydrogen, carbon, and oxygen. Exemplary oxygenated hydrocarbons in biomass-derived pyrolysis oil include alcohols such as phenols and cresols, carboxylic acids, alcohols, aldehydes, etc.

A feed stream containing a biomass-derived pyrolysis oil and a hydrogen-containing gas are introduced to a first hydroprocessing reactor. The biomass-derived pyrolysis oil may be produced, such as, for example, from pyrolysis of biomass in a pyrolysis reactor. Virtually any form of biomass can be used for pyrolysis to produce a biomass-derived pyrolysis oil. The biomass-derived pyrolysis oil may be derived from biomass material, such as, wood, agricultural waste, nuts and seeds, algae, forestry residues, and the like. The biomass-derived pyrolysis oil may be obtained by different modes of pyrolysis, such as, for example, fast pyrolysis, vacuum pyrolysis, catalytic pyrolysis, and slow pyrolysis or carbonization, and the like. The composition of the biomass-derived pyrolysis oil can vary considerably and depends on the feedstock and processing variables. Examples of biomass-derived pyrolysis oil "as-produced" can contain up to about 1000 to about 2000 ppm total metals, about 20 to about 33 wt % of water that can have high acidity (e.g. total acid number (TAN)>150), and a solids content of about 0.1 to about 5 wt %. The biomass-derived pyrolysis oil may be untreated (e.g. "as produced"). However, if needed the biomass-derived pyrolysis oil can be selectively treated to reduce any or all of the above to a desired level.

The first hydroprocessing reactor contains a first deoxygenating catalyst. The first hydroprocessing reactor may be, for example, a batch reactor or a continuous flow reactor, such as, an upflow or downflow tubular reactor with or without a fixed catalyst bed, a continuously stirred reactor, and the like. Other reactors known to those skilled in the art for catalytic hydroprocessing of an oil-based feedstock may also be used. In an exemplary embodiment, the first hydroprocessing reactor is operating at first predetermined hydroprocessing conditions including a reaction temperature of from about 100° to about 400° C., a pressure of from about 3200 to about 12400 kPa (about 450 to about 1800 psig), a liquid hourly space velocity of from about 0.25 volume of liquid feed/volume of catalyst/hour ($Hr^{-1}$) to about 1.0 $Hr^{-1}$, and a hydrogen-containing gas treat rate of about 178 to about 2136 $Nm^3/m^3$ (about 1000 to about 12000 SCF/B).

The biomass-derived pyrolysis oil contained in the feed stream contacts the first deoxygenating catalyst at the first predetermined hydroprocessing conditions in the presence of hydrogen to form a first low-oxygen biomass-derived pyrolysis oil effluent by converting at least a portion of the oxygenated hydrocarbons in the biomass-derived pyrolysis oil into hydrocarbons. In particular, hydrogen from the hydrogen-containing gas removes oxygen from the biomass-derived pyrolysis oil as water, thereby producing a low-oxygen biomass-derived pyrolysis oil effluent. The oil contained in the low-oxygen biomass-derived pyrolysis oil effluent may be partially deoxygenated with some residual oxygenated hydrocarbons, or may be substantially fully deoxygenated where substantially all of the oxygenated hydrocarbons are converted into hydrocarbons.

The low-oxygen biomass-derived pyrolysis oil effluent is removed from the first hydroprocessing reactor and passed along to a separation unit to remove water and form a water-depleted low-oxygen biomass-derived pyrolysis oil effluent. The water-depleted low-oxygen biomass-derived pyrolysis oil effluent may be removed from the apparatus or recycled to the first hydroprocessing reactor.

In an exemplary embodiment, at least a portion of the water-depleted low-oxygen biomass-derived pyrolysis oil effluent is passed to a second hydroprocessing reactor. The water-depleted low-oxygen biomass-derived pyrolysis oil effluent is exposed to a second deoxygenating catalyst in the presence of an additional hydrogen-containing gas at second predetermined hydroprocessing conditions in the second hydroprocessing reactor to convert any residual oxygenated hydrocarbons in the effluent into hydrocarbons and form a second low-oxygen biomass-derived pyrolysis oil effluent. Preferably, the second low-oxygen biomass-derived pyrolysis oil effluent is substantially fully deoxygenated, i.e., oxygen-free. The second deoxygenating catalyst may be a conventional hydroprocessing catalyst such as nickel and molybdenum on a gamma alumina support or others well known in the art, or alternatively may have a similar composition to the first deoxygenating catalyst. The second predetermined hydroprocessing conditions include a reaction temperature of from about 300° to about 350° C., a pressure of from about 3550 to about 12400 kPa (500 to about 1800 psig), a liquid hourly space velocity of from about 0.5 to about 1.5 $hr^{-1}$, and a hydrogen-containing gas treat rate of about 71 to about 1425 $Nm^3/m^3$ (about 400 to about 8000 SCF/B). The second hydroprocessing reactor 28 may be a reactor such as a fixed bed tubular reactor, a stir tank reactor, and the like.

The minimum total amount of hydrogen-containing gas and/or additional hydrogen-containing gas needed to convert substantially all of the oxygenated hydrocarbons of the biomass-derived pyrolysis oil contained in the feed stream comprises 1-2 equivalents of hydrogen-containing gas per one equivalent of non-water oxygen. The non-water oxygen in the biomass-derived pyrolysis oil is derived from the functional groups of the oxygenated hydrocarbons therein. For example, one equivalent of an alcohol functional group and a ketone functional group requires 1 equivalent of hydrogen-containing gas for deoxygenation whereas one equivalent of an ester functional group requires 2 equivalents of hydrogen-containing gas, and 1 equivalent of a carboxylic acid functional group requires 1.5 equivalents of hydrogen-containing gas. Therefore, for example, the more esters and carboxylic acids present in the biomass-derived pyrolysis oil, the more hydrogen-containing gas is necessary for conversion of all the oxygenated hydrocarbons therein into hydrocarbons. The minimum amount of hydrogen-containing gas to substantially deoxygenate the biomass-derived pyrolysis oil is equal to about one to about three molar equivalents of the non-water oxygen therein. The amount of non-water oxygen=A−B wherein A is the total amount of oxygen in the biomass-derived pyrolysis oil as determined by a combustion method that is well known in the art, and B is the total amount of oxygen in the water in the biomass-derived pyrolysis oil. To determine B, the total water content in the biomass-derived pyrolysis oil is first determined by the Karl Fischer Reagent Titration Method (ASTM D1364) as known to one skilled in the art. An excess of hydrogen-containing gas and/or may also be used.

The second low-oxygen biomass-derived pyrolysis oil effluent can be removed from the apparatus. In at least one exemplary embodiment, at least a portion of the water-depleted low-oxygen biomass-derived pyrolysis oil effluent and/or at least a portion of the second low-oxygen biomass-derived pyrolysis oil effluent are recycled in the apparatus by being directed to the feed stream. In one example, at least a portion of the water-depleted low-oxygen biomass-derived pyrolysis oil effluent is introduced to the feed stream upstream of the first hydroprocessing reactor. In another example, the second low-oxygen biomass-derived pyrolysis oil effluent is passed and introduced to the feed stream upstream of the first hydroprocessing reactor. Recycling at least a portion of the water-depleted low-oxygen biomass-derived pyrolysis oil effluent and/or the second low-oxygen biomass-derived pyrolysis oil effluent helps control the temperature of the highly exothermic deoxygenation reaction in the first hydroprocessing reactor. The benefits of recycling at least a portion of either of these effluents include, but are not limited, increasing hydrogen solubility, immolation of the exotherm by dilution of the reactive species, and reducing the reaction rate of bimolecular reactants that lead to plugging of the catalyst. The preferred ratio of the recycled water-depleted low-oxygen biomass-derived pyrolysis oil effluent and/or the recycled second low-oxygen biomass-derived pyrolysis oil effluent comprises a ratio of from about 1.5:1 to about 5:1.

In an embodiment, the invention is a process for removing a nitrogen compound as well as other impurities from pyrolysis oil comprising a contacting step and a separating step. This contacting step is generally after a deoxygenation step, but in some instances may be at a different step in the process of treating the pyrolysis oil. In the contacting step, pyrolysis oil comprising the nitrogen compound and a pyrolysis oil-immiscible ionic liquid which would include a pyrolysis oil-immiscible ionic liquid that can be made immiscible by dilution with water are contacted or mixed. The contacting may facilitate transfer or extraction of the one or more nitrogen compounds and other impurities from the pyrolysis oil to the ionic liquid. In an embodiment, at least 20 wt % of the nitrogen compounds are removed from the first deoxygenated bio-derived pyrolysis oil. Preferably, at least 30 wt % of the nitrogen compounds is removed during the ionic liquid treating step. More preferably, at least 40 wt % of the nitrogen compounds are removed during this step and most preferably, at least 50 wt % of the nitrogen compounds are removed from the low-oxygen content bio-derived pyrolysis oil during the ionic liquid treating step.

In an exemplary embodiment, the low-oxygen content bio-derived pyrolysis oil contains phenolic compounds. Phenolic compounds are compounds containing a hydroxyl group bound to an aromatic ring and include phenol, C1-substituted phenols (i.e., methyl-phenols), C2-substituted phenols (i.e., dimethyl- and ethyl-phenols), C3-substituted phenols (i.e., trimethyl-, methylethyl-, isopropyl- and propyl-phenols), C4-substituted phenols and C5-substituted phenols. Other alkylated phenols or other types of phenolic compounds are also extractable and contemplated as phenolic compounds. The process for removing a phenolic compound from a low-oxygen content bio-derived pyrolysis oil comprises an ionic liquid contacting step and a separating step to yield a purified low-oxygen content bio-derived pyrolysis oil effluent lower in phenolic compound content and a pyrolysis oil immiscible ionic liquid effluent comprising a least a portion of the phenolic compound. At least 30 wt % of at least one of the phenolic compounds in the low-oxygen content bio-derived pyrolysis oil is removed during the ionic liquid contacting step. Preferably, at least 50 wt % of at least one of the phenolic compounds is removed. More preferably, at least 50 wt % of the phenolic compounds in the low-oxygen content bio-derived pyrolysis oil are removed in the ionic liquid contacting step. Most preferably, at least 80 wt % of at least one phenolic compound is removed. In an extraordinary embodiment, substantially all the phenol in the low-oxygen content biomass-derived pyrolysis oil is removed in the ionic liquid contacting step.

Although a pyrolysis-immiscible ionic liquid that is partially soluble in pyrolysis oil may facilitate transfer of the nitrogen or phenolic compound from the pyrolysis oil to the ionic liquid, partial solubility is not required. Insoluble pyrolysis oil/ionic liquid mixtures may have sufficient interfacial surface area between the pyrolysis oil and ionic liquid to be useful. In the separation step, the mixture of pyrolysis oil and ionic liquid settles or forms two phases, a pyrolysis oil phase and ionic liquid phases, which are separated to produce a pyrolysis oil-immiscible ionic liquid effluent and a pyrolysis oil effluent. Additional steps may be required to complete the separation of the pyrolysis oil from the ionic liquid.

The process may be conducted in various equipment well known in the art that are suitable for batch or continuous operation. For example, in a small scale form of the invention, pyrolysis oil and a pyrolysis oil-immiscible ionic liquid may be mixed in a beaker, flask, or other vessel, e.g. by stirring, shaking, use of a mixer, or a magnetic stirrer. The mixing or agitation is stopped and the mixture forms a pyrolysis oil phase and an ionic liquid phase which can be separated, for example, by decanting, centrifugation, or use of a pipette to produce a pyrolysis oil effluent having a lower nitrogen compound content relative to the pyrolysis oil. The process also produces a pyrolysis oil-immiscible ionic liquid effluent comprising the nitrogen.

The contacting and separating steps may be repeated, for example, when the nitrogen content of the pyrolysis oil effluent is to be reduced further to obtain a desired metal level in the ultimate pyrolysis oil product stream from the process. Each set, group, or pair of contacting and separating steps may be referred to as a metal removal step. Thus, the invention encompasses single and multiple metal removal steps. A nitrogen removal zone may be used to perform a metal removal step. As used herein, the term "zone" can refer to one or more equipment items and/or one or more sub-zones. Equipment items may include, for example, one or more vessels, heaters, separators, exchangers, conduits, pumps, compressors, and controllers. Additionally, an equipment item can further include one or more zones or sub-zones. The metal removal process or step may be conducted in a similar manner and with similar equipment as is used to conduct other liquid-liquid wash and extraction operations. Suitable equipment includes, for example, columns with: trays, packing, rotating discs or plates, and static mixers. Pulse columns and mixing/settling tanks may also be used.

Accordingly, methods and catalysts for deoxygenating and denitrogenating a biomass-derived pyrolysis oil have been described.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention, it being understood that various changes may be made in the function and arrangement of elements described in an exemplary embodiment without departing from the scope of the invention as set forth in the appended Claims and their legal equivalents.

EXAMPLES

The examples are presented to further illustrate some aspects and benefits of the invention and are not to be considered as limiting the scope of the invention.

Example 1

Typical pyrolysis oils have high oxygen content. The pyrolysis oil phase did not separate well from the ionic liquid phase after mixing with either Cyphos 106 (triisobutylmethyl phosphonium tosylate) or Cyphos 169 (tributylethylphosphonium diethylphosphate). After deoxygenation in a first hydroprocessing reactor according to the process taught herein, the elemental composition of one deoxygenated pyrolysis oil is shown in Table 1. This deoxygenated pyrolysis oil was used in the following two examples.

TABLE 1

| Analysis of deoxygenated pyrolysis oil | |
|---|---|
| Element | Mass-% |
| Carbon, wt % | 90.3 |
| Hydrogen, wt % | 9.21 |
| Nitrogen, ppm | 1287 |
| Oxygen, wt % | 0.26 |
| Sulfur, ppm | 7 |

Example 2

In this example, 3 g Cyphos 106 and 15 g deoxygenated pyrolysis oil were combined in a beaker with a stir bar. The beaker was placed onto a heated stir plate and stirred at 500 rpm and 80° C. for 30 minutes. After 30 minutes, the stirring was stopped and the ionic liquid/deoxygenated pyrolysis oil mixture was allowed to settle for 30 minutes. Clear separation between the oil and the ionic liquid phase is achieved. The deoxygenated pyrolysis oil phase was then separated from the ionic liquid and analyzed for N content. The deoxygenated pyrolysis material after Cyphos 106 extraction was found to contain 680 ppm N, indicating 47% efficiency of nitrogen removal.

The deoxygenated pyrolysis oil, the deoxygenated pyrolysis oil after IL extraction and the extract were further analyzed by gas chromatography coupled with mass spectrometer (GC-MS) and flame ionization detector (GC-FID). Both GC-MS and GC-FID were configured and operated in such a way that identification by GC-MS can be translated to GC-FID for quantitation. Briefly, the same column (e.g., 50 m PONA column from Agilent corp.) and the same temperature ramping program were used in this study. The analysis showed that Cyphos 106 separated phenolic compounds from the deoxygenated pyrolysis oil phase as well as removed nitrogen containing compounds.

Major phenolic compounds that were extracted by Cyphos 106 include phenol, C1-substituted phenols (i.e., methyl-phenols), C2-substituted phenols (i.e., dimethyl- and ethyl-phenols), C3-substituted phenols (i.e., trimethyl-, methylethyl-, isopropyl- and propyl-phenols), C4-substituted phenols and C5-substituted phenols. Other alkylated phenols or other types of phenolic compounds were also extractable but were at relatively low concentration in this particular deoxygenated pyrolysis oil. In this example, about 85% of the total phenols were extracted and the efficiency for different phenol types is listed in Table 2. Phenol extraction efficiency varies with the types of phenols, the ionic liquid or ionic liquid mixture used to extract, and the ratio of ionic liquid to deoxygenated pyrolysis oil. For example, impact of alkylation on phenol extraction with ionic liquid was exhibited in Table 2. In this example, ionic liquid extraction efficiency is decreased with higher degree of alkylation.

TABLE 2

| Extraction efficiency of phenols in the deoxygenated pyrolysis oil by Cyphos 106 | |
|---|---|
| Phenols | Extraction Efficiency/% |
| Phenol | 100 |
| Methyl-phenols | 100 |
| C2-substituted phenols | 93 |
| C3-substituted phenols | 82 |
| C4-substituted phenols | 69 |
| C5-substituted phenols | 52 |

The invention claimed is:

1. A method for purifying a biomass-derived pyrolysis oil, the method comprising the steps of:
contacting the biomass-derived pyrolysis oil with a first deoxygenating catalyst in the presence of hydrogen at first predetermined hydroprocessing conditions to form a first low-oxygen biomass-derived pyrolysis oil effluent; and
contacting the first low-oxygen biomass-derived pyrolysis oil effluent with an ionic liquid to remove impurities from said first low-oxygen biomass-derived pyrolysis oil effluent wherein said impurities consist of at least one nitrogen compound or one phenolic compound.

2. The method of claim 1, further comprising contacting said low-oxygen biomass-derived pyrolysis oil with a second deoxygenating catalyst in the presence of hydrogen at second predetermined hydroprocessing conditions to form a second low-oxygen biomass-derived pyrolysis oil effluent.

3. The method of claim 2 wherein said low-oxygen biomass-derived pyrolysis oil is contacted with said second deoxygenating catalyst after said ionic liquid removes said impurities.

4. The method of claim 1 wherein said ionic liquid is selected from the group consisting of 1-ethyl-3-methylimidazolium ethyl sulfate, 1-butyl-3-methylimidazolium hydrogen sulfate, 1-ethyl-3-methylimidazolium chloride, 1-butyl-3-methylimidazolium chloride and mixtures thereof.

5. The method of claim 1 wherein said ionic liquid is selected from the group consisting of trihexyl(tetradecyl)phosphonium chloride, trihexyl(tetradecyl)phosphonium bromide, tributyl(methyl)phosphonium bromide, tributyl(methyl)phosphonium chloride, tributyl(hexyl)phosphonium bromide, tributyl(hexyl)phosphonium chloride, tributyl(octyl)phosphonium bromide, tributyl(octyl)phosphonium chloride, tributyl(decyl)phosphonium bromide, tributyl(decyl)phosphonium chloride, tetrabutylphosphonium bromide, tetrabutylphosphonium chloride, triisobutyl(methyl)phosphonium tosylate, tributyl(methyl)phosphonium methylsulfate, tributyl(ethyl)phosphonium diethylphosphate, tetrabutylphosphonium methanesulfonate tetrabutylphosphonium methane sulfonate, pyridinium p-toluene sulfonate, tributyl(ethyl)phosphonium diethylphosphate, tetraalkylphosphonium dialkylphosphates, tetraalkylphosphonium dialkyl phosphinates, tetraalkylphosphonium phosphates, tetraalkylphosphonium tosylates, tetraalkylphosphonium sulfates, tetraalkylphosphonium sulfonates, tetraalkylphosphonium carbonates, tetraalkylphosphonium metalates, oxometalates, tetraalkylphosphonium mixed metalates, tetraalkylphosphonium polyoxometalates, and tetraalkylphosphonium halides and combinations thereof.

6. The method of claim 1 wherein said ionic liquids are selected from the group consisting of at least one of 1-ethyl-3-methylimidazolium ethyl sulfate, 1-butyl-3-methylimidazolium hydrogen sulfate, 1-ethyl-3-methylimidazolium chloride, 1-butyl-3-methylimidazolium chloride, tetrabutylphosphonium methane sulfonate, pyridinium p-toluene sulfonate, tetrabutylphosphonium chloride, tetrabutylphosphonium bromide, tributyl(octyl)phosphonium chloride, triisobutyl(methyl)phosphonium tosylate and tributyl(ethyl)phosphonium diethylphosphate.

7. The method of claim 1 wherein at least 20 wt % of the nitrogen compounds are removed from said first low-oxygen biomass-derived pyrolysis oil effluent.

8. The method of claim 1 wherein at least 50% of the nitrogen compounds are removed from said first low-oxygen biomass-derived pyrolysis oil effluent.

9. The method of claim 1 wherein said at least one phenolic compound is selected from the group consisting of phenol, C1-substituted phenols (i.e., methyl-phenols), C2-substituted phenols (i.e., dimethyl- and ethyl-phenols), C3-substituted phenols (i.e., trimethyl-, methylethyl-, isopropyl- and propyl-phenols), C4-substituted phenols and C5-substituted phenols.

10. The method of claim 1 wherein at least 30 wt % of said at least one phenolic compound is removed from said first low-oxygen biomass-derived pyrolysis oil effluent.

11. The method of claim 1 wherein at least 80 wt % of said at least one phenolic compound is removed from said first low-oxygen biomass-derived pyrolysis oil effluent.

12. A method for purifying a biomass-derived pyrolysis oil, the method comprising
contacting a low-oxygen biomass-derived pyrolysis oil effluent with an ionic liquid to remove phenolic compound impurities from said low-oxygen biomass-derived pyrolysis oil effluent.

13. The method of claim 12 wherein said ionic liquid are selected from the group consisting of trihexyl(tetradecyl)phosphonium chloride, trihexyl(tetradecyl)phosphonium bromide, tributyl(methyl)phosphonium bromide, tributyl(methyl)phosphonium chloride, tributyl(hexyl)phosphonium bromide, tributyl(hexyl)phosphonium chloride, tributyl(octyl)phosphonium bromide, tributyl(octyl)phosphonium chloride, tributyl(decyl)phosphonium bromide, tributyl(decyl)phosphonium chloride, tetrabutylphosphonium bromide, tetrabutylphosphonium chloride, triisobutyl(methyl)phosphonium tosylate, tributyl(methyl)phosphonium methylsulfate, tributyl(ethyl)phosphonium diethylphosphate, tetrabutylphosphonium methanesulfonate, and combinations thereof.

14. The method of claim 12 wherein at least 30 wt % of said at least one phenolic compound is removed from said first low-oxygen biomass-derived pyrolysis oil effluent.

15. The method of claim 12 wherein at least 80 wt % of said at least one phenolic compound is removed from said first low-oxygen biomass-derived pyrolysis oil effluent.

16. The method of claim 12 wherein at least 20% of the nitrogen compounds are removed from said low-oxygen biomass-derived pyrolysis oil effluent.

* * * * *